(12) United States Patent
Chehade et al.

(10) Patent No.: US 8,429,063 B2
(45) Date of Patent: *Apr. 23, 2013

(54) MANAGEMENT OF BUSINESS PROCESSES

(75) Inventors: Fadi B. Chehade, Irvine, CA (US);
Tony P. Curwen, Boca Raton, FL (US);
Linda York, Irvine, CA (US)

(73) Assignee: Ebay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/475,073

(22) Filed: May 18, 2012

(65) Prior Publication Data

US 2012/0233023 A1 Sep. 13, 2012

Related U.S. Application Data

(60) Continuation of application No. 12/498,578, filed on Jul. 7, 2009, now Pat. No. 8,229,836, which is a division of application No. 09/757,771, filed on Jan. 9, 2001, now Pat. No. 7,562,041.

(51) Int. Cl.
*G06Q 40/00* (2012.01)
*G06Q 30/00* (2012.01)
*G06F 15/16* (2006.01)

(52) U.S. Cl.
USPC ...... 705/37; 705/26.2; 705/26.41; 705/26.43; 709/204; 709/205; 709/228; 709/232

(58) Field of Classification Search .................... 705/37, 705/26.2, 26.41, 26.43
See application file for complete search history.

(56) References Cited

U.S. PATENT DOCUMENTS

| 3,249,919 A | 5/1966 | Scantlin |
| 3,573,747 A | 4/1971 | Adams et al. |
| 5,237,157 A | 8/1993 | Kaplan |
| 5,251,205 A * | 10/1993 | Callon et al. .................. 370/392 |
| 5,285,383 A | 2/1994 | Lindsey et al. |

(Continued)

FOREIGN PATENT DOCUMENTS

| WO | 0205508 | 1/2002 |
| WO | 0215515 | 2/2002 |
| WO | 0227614 | 4/2002 |
| WO | 03034228 | 4/2003 |

OTHER PUBLICATIONS

The buying connection; Fletcher-McDonald, Trina; InfoWorld v21n29; Jul. 19, 1999; 13-pages.*

Test Center Comparison; Fletcher-MacDonald, Trina; InfoWorld, 21, 29; Jul. 19, 1999; 16-pages.*

(Continued)

*Primary Examiner* — Gregory Johnson
(74) *Attorney, Agent, or Firm* — Haynes and Boone, LLP

(57) ABSTRACT

A method and apparatus for managing business processes. First business process data obtained from a first trading participant includes a set of transaction messages having a first data format in accordance with a first protocol for conducting business transactions used by the first trading participant. A virtual trading participant receives fictitious business process data from the first trading participant and acknowledging the fictitious business process data and replying to the first trading participant that the fictitious business process data has been acknowledged. Operational characteristics and a connectivity of a currently trading participant connected to a process management platform accessible via an interconnection fabric are tested, by utilizing the virtual trading participant to determine if the data defining individual business processes is in a uniform format understood by a process management platform. The virtual trading participant is utilized to ensure compatibility with an identified version of the uniform format.

20 Claims, 7 Drawing Sheets

U.S. PATENT DOCUMENTS

| | | | |
|---|---|---|---|
| 5,297,032 A | 3/1994 | Trojan et al. | |
| 5,761,661 A | 6/1998 | Coussens et al. | |
| 5,845,266 A | 12/1998 | Lupien et al. | |
| 6,023,686 A | 2/2000 | Brown | |
| 6,035,287 A | 3/2000 | Stallaert et al. | |
| 6,256,773 B1 | 7/2001 | Bowman-Amuah | |
| 6,336,105 B1* | 1/2002 | Conklin et al. | 705/80 |
| 6,397,191 B1 | 5/2002 | Notani et al. | |
| 6,625,581 B1 | 9/2003 | Perkowski | |
| 6,671,692 B1 | 12/2003 | Marpe et al. | |
| 6,772,216 B1* | 8/2004 | Ankireddipally et al. | 709/227 |
| 6,952,768 B2* | 10/2005 | Wray | 713/152 |
| 6,976,075 B2* | 12/2005 | Ma | 709/228 |
| 7,051,071 B2* | 5/2006 | Stewart et al. | 709/204 |
| 7,069,234 B1 | 6/2006 | Cornelius et al. | |
| 7,080,092 B2 | 7/2006 | Upton | |
| 7,130,807 B1 | 10/2006 | Mikurak | |
| 7,257,637 B2 | 8/2007 | Takahashi et al. | |
| 7,269,744 B1* | 9/2007 | Shippy et al. | 713/193 |
| 7,275,057 B2 | 9/2007 | Imanishi et al. | |
| 7,562,041 B2 | 7/2009 | Chehade et al. | |
| 7,620,570 B2 | 11/2009 | Albazz et al. | |
| 2001/0039570 A1 | 11/2001 | Stewart et al. | |
| 2002/0019797 A1 | 2/2002 | Stewart et al. | |
| 2002/0026433 A1 | 2/2002 | Kuiper | |
| 2002/0026630 A1 | 2/2002 | Schmidt et al. | |
| 2002/0029201 A1* | 3/2002 | Barzilai et al. | 705/80 |
| 2002/0032622 A1 | 3/2002 | Petit et al. | |
| 2002/0032717 A1 | 3/2002 | Malan et al. | |
| 2002/0042757 A1 | 4/2002 | Albazz et al. | |
| 2002/0042782 A1 | 4/2002 | Albazz et al. | |
| 2002/0046081 A1 | 4/2002 | Albazz et al. | |
| 2002/0046301 A1* | 4/2002 | Shannon et al. | 709/328 |
| 2002/0052824 A1* | 5/2002 | Mahanti et al. | 705/37 |
| 2002/0059253 A1 | 5/2002 | Albazz et al. | |
| 2002/0065885 A1* | 5/2002 | Buonanno et al. | 709/205 |
| 2002/0128946 A1 | 9/2002 | Chehade et al. | |
| 2002/0147622 A1* | 10/2002 | Drolet et al. | 705/7 |
| 2003/0093575 A1 | 5/2003 | Upton | |
| 2003/0135482 A1 | 7/2003 | Takahashi et al. | |
| 2003/0202638 A1 | 10/2003 | Eringis et al. | |
| 2003/0208526 A1 | 11/2003 | Imanishi et al. | |
| 2004/0230447 A1 | 11/2004 | Schwerin-Wenzel et al. | |
| 2005/0197970 A1 | 9/2005 | Chehade et al. | |
| 2009/0276624 A1 | 11/2009 | Chehade et al. | |

OTHER PUBLICATIONS

An Alphabet Soup of B2B Standards—Soap, ebXML, UDDI and others will slowly gain momentum in 2001; Dec. 18, 2000; CMP Media, Inc.; 6-pages.*

The exciting role of the credit manager in the expanding e-commerce marketplace; Diane R Murphy; Business Credit; Oct. 2000; 102, 9; 10-pages.*

Notice of Allowance (Mail Date Mar. 6, 2009) for U.S. Appl. No. 09/757,771, filed Jan. 9, 2001; Confirmation No. 8439.

About e-business [online]. IBM [retrieved on May 2, 2001]. Retrieved from the Internet: <URL: http://www-3.ibm.com/e-business/overview/>. 2 pages.

Alpher, David; CEFACT and ebXML: The Future of International e-Commerce? [online]. ebizQ.net [retrieved on May 2, 2001]. Retrieved from the Internet: <URL: http://www.messageq.com/communications_middleware/alpher_2.html>. 4 pages.

Archive Managing B2B Transaction Information, Oct. 2000, Archive Inc., Culver City, California. 9 pages.

Archive Business-to-Business Transaction Archiving, Dec. 1999, Archive, Inc., Culver City, California. 11 pages.

Archive Technical Brief, Dec. 1999, Archive, Inc., Culver City, California. 12 pages.

Archive Technical Brief [online], Archive, Inc., Mar. 2001 [retrieved on May 7, 2001]. Retrieved from the Internet: <URL: http://www.archive.com>. 12 pages.

Archive White Paper [online], Archive, Inc., Mar. 2001 [retrieved on May 7, 2001]. Retrieved from the Internet: <URL: http://www.archive.com>. 12 pages.

Corporate Information Overview [online]. Ariba, Inc. [retrieved on May 2, 2001]. Retrieved from the Internet: <URL: http://www.ariba.com/corporate/corporate_overview.cfm>. 1 page.

Customer Service Overview [online]. Ariba, Inc. [retrieved on May 2, 2001]. Retrieved from the internet: <URL: http://www.ariba.com/customers_service/customer>. 1 page.

Ariba, IBX, Enterprise Business [online]. CNET Networks, Inc. [retrieved on May 2, 2001]. Retrieved from the Internet: <URL: http://enterprise.cnet.com/enterprise/0-9572-701-1598221.html>. 2 pages.

BEA Systems; BEA WebLogic Process Integrator supports work flow of E-business processes; Nov. 6, 2000. 3 pages.

Bloomberg News; Ariba, Commerce One shares hit on analyst comment, Tech News, Nov. 27, 2000 [online]. CNET Networks, Inc. [retrieved on May 2, 2001]. Retrieved from the Internet: <URL: http://news.cnet.com/news/0-1007-200-3878450.html?tag=st.ne.ron.lthd>. 2 pages.

Bryan, Martin; Instructions for capturing ebXML Core Component definitions [online]. The SGML Centre, Jul. 6, 2000 [retrieved on May 2, 2001]. Retrieved from the Internet: <URL: http://www.personal.u-net.com/~sgml/instructions.htm>. 18 pages.

Commerce One is the e-Marketplace Company, Company Overview [online]. Commerce One Inc. [retrieved on May 2, 2001]. Retrieved from the Internet: <URL: http://www.commerceone.com/company/default.html>. 1 page.

Commerce One.Net, The Premier Business-To-Business E-Marketplace [online]. Commerce One, Inc. [retrieved on May 2, 2001]. Retrieved from the Internet: <URL: http://www.marketsite.net>. 1 page.

Cover, Robin; The XML Cover Pages, Electronic Business XML Initiative (ebXML) [online]. Robin Cover and Oasis, Apr. 25, 2001 [retrieved on May 2, 2001]. Retrieved from the Internet: <URL: http://www.oasis-open.org/cover/ebXML.html>. 21 pages.

DCI NetSessions; Rapid, Efficient RosettaNet Deployment: Maximizing the Benefit of RosettaNet Standards [online], [retrieved on May 3, 2000]. Retrieved from the Internet: <URL: http://www.dci.com/netsessions/events/rosettanet.htm>. 2 pages.

Demers, Marie Eve; Viacore to Link Microsoft—Company Business and Marketing—Brief Article; Electronic News, Jan. 8, 2001. 2 pages.

Dictionaries [online], [retrieved on Jul. 12, 2000]. Retrieved from the Internet: <URL: http://www.rosettanet.org/general/dictionaries.htm>. 1 page.

Do Business with Anyone, Anytime, Anywhere, Solutions Overview [online]. Commerce One, Inc. [retrieved on May 2, 2001]. Retrieved from the Internet: <URL: http://www.commerceone.com/solutions/>. 1 page.

Drummond, Rik; ebXML: The Only Chance for a Worldwide Standard, E-Business Advisor [online]. Advisor Media, Inc., Apr. 2000 [retrieved on May 2, 2001]. Retrieved from the Internet: <URL: http://www.advisor.com/Articles.nsf/aid/DRUMR07>. 4 pages.

ebXML Press Clippings [online]. Rachel Foerster & Associates, Ltd. [retrieved on May 2, 2001]. Retrieved from the Internet: <URL: http://www.rfa-edi.com/ebxml_press_clippings.htm>. 3 pages.

Edwards, Kara; ebXML: A Global Initiative, Advisor [online]. Advisor Media, Inc., Mar. 21, 2000 [retrieved on May 2, 2001]. Retrieved from the Internet: <URL: http://www.advisor.com/Articles.nsf/AID/EDWAK041>. 3 pages.

Collaboration Management System, e-STEEL [online], e-STEEL Corporation [retrieved on May 11, 2001]. Retrieved from the Internet: <URL: http://www.esteel.com/cms.shtml>. 1 page.

Collaborative Commerce for Direct Materials, e-STEEL [online], e-STEEL Corporation 1998-2001 [retrieved on May 11, 2001]. Retrieved from the Internet: <URL: http://www.esteel.com>. 1 page.

e-STEEL Launches Strategic New Exchange Feature: Mass Negotiation, e-STEEL Press Releases, Apr. 2, 2001 [online], e-STEEL Corporation [retrieved on May 11, 2001]. Retrieved from the Internet: <URL: http://www.esteel.com/news/pressroom/pressreleases/2001/apr/pressrelease040201.shtml>. 2 pages.

Private Marketplace, e-STEEL [online], e-STEEL Corporation [retrieved on May 11, 2001]. Retrieved from the internet: <URL: http://www.esteel.com/privatemarketplace.shtml>. 3 pages.

Solutions, e-STEEL [online], e-STEEL Corporation [retrieved on May 11, 2001]. Retrieved from the Internet: <URL: http://www.esteel.com/solutions.shtml>. 1 page.
Web Hosting, e-STEEL [online], e-STEEL Corporation [retrieved on May 11, 2001]. Retrieved from the Internet: <URL: http://www.esteel.com/webhosting.shtml>. 1 page.
Executive Overview: Managing Real World B2B Integration [online], Vitria Technology, Inc. [retrieved on May 4, 2001]. Retrieved from the Internet: <URL: http://www.vitria.com>. 12 pages.
Fletcher-MacDonald, Trina; Test Center Comparison, InfoWorld, Jul. 19, 1999, v 21, n 29. 15 pages.
Global Manufacturers and Retailers Adopt ebXML, OASIS News [online]. OASIS, Mar. 20, 2000 [retrieved on May 2, 2001]. Retrieved from the Internet: <URL: http://www.oasis-open.org/news/oasis_news_09_11_00.shtml>. 2 pages.
Guiglielmo, Connie, Talking the E-Biz Talk [online]. Ziff David, Inc., Jun. 8, 1998 [retrieved on May 2, 2001]. Retrieved from the Internet: <URL: http://www.zdnet.com/intweek/daily/980608e.html>. 2 pages.
About OBI, Open Buying on the Internet (OBI) Consortium [online]. The OBI Consortium [retrieved on May 2, 2001]. Retrieved from the Internet: <URL: http://www.openbuy.org/obi/about/>. 1 page.
OBI Library, Open Buying on the Internet (OBI) Consortium [online]. The OBI Consortium [retrieved on May 2, 2001]. Retrieved from the Internet: <URL: http://www.openbuy.org/obi/library/>. 1 page.
Open Buying on the Internet, Open Buying on the Internet (OBI) Consortium [online]. The OBI Consortium [retrieved on May 2, 2001]. Retrieved from the Internet: <URL: http://www.openbuy.org/obi/library/white-paper.html>. 4 pages.
Newman, Amy; DataChannel Joins OASIS, the UN in Support of ebXML, Internet News—Web Developer News [online]. internet.com™ Dec. 2, 1999 [retrieved on May 2, 2001]. Retrieved from the Internet: <URL: http://www.internetnews.com/wd-news/article/00..10_253221.00.html>. 2 pages.
mySAP™ Technology, mySAP.com Solutions [online], [retrieved on May 4, 2001]. Retrieved from the Internet: <URL: http://www.sap.com/solutions/technology/technology_over.htm>. 1 page.
mySAP.com™—Solutions for the New New Economy, mySAP.com Solutions [online], [retrieved on May 4, 2001]. Retrieved from the Internet: <URL: http://www.sap.com/solutions/solutions_over.htm>. 1 page.
mySAP™ Services, mySAP.com Solutions [online], [retrieved on May 4, 2001]. Retrieved from the Internet: <URL: http://www.sap.com/education/education_over.htm>. 1 page.
mySAP™ Education, mySAP.com Solutions [online], [retrieved on May 4, 2001]. Retrieved from the Internet: <URL: http://www.sap.com/education/education_over.htm>. 1 page.
mySAP E-Commerce™, SAP E-Business Solutions [e-Commerce] [online], [retrieved on May 4, 2001]. Retrieved from the Internet: <URL: http://www.sap.com/solutions/e-commerce/e-commerce_over.htm>. 1 page.
Murphy, Ph.D., Diane R.; The Exciting Rise of the Credit Manager in the Expanding Commerce Marketplace; Business Credit; Oct. 2000; 102, 9; ProQuest Central; pp. 64-73.
McLaughlin, Brett; ebXML: Not just another acronym, JavaWorld [online]. ITworld.com, Dec. 19, 2000 [retrieved on May 2, 2001]. Retrieved from the Internet: <URL: http://www.javaworld.com/javaworld/javaone00/j1-00ebxml.html>. 4 pages.
WebSphere software platform [online]. IBM [retrieved on May 2, 2001]. Retrieved from the Internet: <URL: http://www-4.ibm.com/cgi-bin/software/trace3.cgi?file+/software/info/websphere/index.html&S_TACT+100AWW10&S_CMP=cannpaign>. 1 page.
ibm.com, Software, Products & Services [online]. IBM [retrieved on May 2, 2001]. Retrieved from the Internet: <URL: http://www-4.ibm.com/software/>. 1 page.
e-commerce, About e-business [online]. IBM [retrieved on May 2, 2001]. Retrieved from the Internet: <URL: http://www-3.ibm.com/e-business/overview/28210.html>. 2 pages.
IBM e-business, About e-business [online]. IBM [retrieved on May 2, 2001]. Retrieved from the Internet: <URL: http://www-3.ibm.com/e-business/overview/28212.html>. 2 pages.
Application Development, Software, Products & Services [online]. IBM [retrieved on May 2, 2001[. Retrieved from the Internet: <URL: http://www-4.ibm.com/software/ad/>. 2 pages.
Harness the Power of E-Business, Services Overview [online]. Commerce One, Inc. [retrieved on May 2, 2001]. Retrieved from the Internet: <URL: http://www.commerceone.com/services/>. 1 page.
RosettaNet EConcert Survival Guide, Jun. 27-29, 2000, Neftish Technologies, Inc. 8 pages.
RosettaNet Executive Overview [online], [retrieved on May 3, 2000]. Retrieved from the Internet: <URL: http://www.rosettanet.org/general/overview.html>. 5 pages.
RosettaNet Executive Overview [online], [retrieved on Jul. 12, 2000]. Retrieved from the Internet: <URL: http://www.rosettanet.org/general/overview.html>. 5 pages.
RosettaNet Implementation Framework Specification Version 1.1, Nov. 8, 1999. 70 pages.
RosettaNet Technical Dictionary to UN/SPSC Mapping Guide, RosettaNet UN/SPSC Users Guide [online], [retrieved on Jul. 12, 2000]. Retrieved from the Internet: <URL: http://apps.rosettanet.org/library/econcert.nsf/e94115323749686f8825673b007ad2.../MapGuide_UNSPSC_R1.0.ht>. 20 pages.
Steinke, Steve; In Search of Integrated Management; Dec 1, 1998, Network, pNA; ISSN: 1093-8001; 8 pages.
Products: MCC Order Server [online], Trilogy Software, Inc. [retrieved on Jun. 1, 2001]. Retrieved from the Internet: <URL: http://www.trilogy.com/Sections/Products/mcc_products/OrderServer.asp>. 1 page.
The Trilogy Fast Cycle Time™ Methodology [online], Trilogy Software, Inc. [retrieved on May 14, 2001]. Retrieved from the Internet: <URL: http://www.trilogy.com/sections/insight/fct.asp>. 6 page.
Trilogy: Products [online], Trilogy Software, Inc. [retrieved on May 14, 2001]. Retrieved from the Internet: <URL: http://www.trilogy.com/sections/products/>. 2 pages.
Trommer, Diane; Viacore Translates RosettaNet, Electronic News, Aug. 7, 2000, pp. 1-3.
Webber, David and Dutton, Anthony; Understanding ebXML, UDDI and XML/edi, XML.ORG—The XML Industry Portal [online]. XMLGlobal, Oct. 2000 [retrieved on May 2, 2001]. Retrieved from the Internet: <URL: http://www.xml.org/feature_articles/2000_1107_miller.shtml>. 4 pages.
webMethods and Technology Solutions Company Partner to Deliver Rapid Business-To-Business Integration (B2BI) Solutions, Press Releases [online], webMethods, Inc., Aug. 30, 2000 [retrieved on May 4, 2001]. Retrieved from the Internet: <URL: http://www.webmethods.com/press_release_detail/1,1075,721,00.html>. 3 pages.
webMethods B2Bi Solution Suite: Leverage a Complete and Effective Integration Software Package [online]. webMethods, Inc. [retrieved on May 4, 2001]. Retrieved from the Internet: <URL: http://www.webmethods.com/content/1,1107,B2BiSolutions,FF.html>. 2 pages.
Webster, John; An Alphabet Soup of B2B Standards—SOAP, ebXML, UDDI and others will slowly gain momentum in 2001; InternetWeek, Dec. 18, 2000; 6 pages.
Welcome to RosettaNet [online], [retrieved on Jul. 12, 2000]. Retrieved from the Internet: <URL: http://www.rosettanet.org/>. 1 page.
Working Tracks, Open Buying on the Internet (OBI) Consortium [online]. The OBI Consortium [retrieved on May 2, 2001]. Retrieved from the Internet: <URL: http://www.openbuy.org/obi/programs/>. 2 pages.
Yendluri, Prasad; RosettaNet Implementation Framework; 2000 webMethods, Inc., Feb. 2000, 10 pages.
Information Materials for IDS; JP counterpart; dated Nov. 16, 2010. 2 pages.
"Notice from the European Patent Office dated Oct. 1, 2007 Concerning Business Methods", Official Journal EPO. 2 pages.
Office Action (Mail Date Jun. 1, 2005) for U.S. Appl. No. 09/757,771, filed Jan. 9, 2001; Confirmation No. 8439.
Final Office Action (Mail Date May 17, 2006) for U.S. Appl. No. 09/757,771, filed Jan. 9, 2001; Confirmation No. 8439.
Office Action (Mail Date Dec. 28, 2006) for U.S. Appl. No. 09/757,771, filed Jan. 9, 2001; Confirmation No. 8439.

Office Action (Mail Date Jun. 7, 2007) for U.S. Appl. No. 09/757,771, filed Jan. 9, 2001; Confirmation No. 8439.
Final Office Action (Mail Date Nov. 8, 2007) for U.S. Appl. No. 09/757,771, filed Jan. 9, 2001; Confirmation No. 8439.
Office Action (Mail Date Apr. 23, 2008) for U.S. Appl. No. 09/757,771, filed Jan. 9, 2001; Confirmation No. 8439.
Office Action (Mail Date May 29, 2007) for U.S. Appl. No. 10/793,187, filed Mar. 4, 2004; Confirmation No. 3802.
Final Office Action (Mail Date Dec. 27, 2007) for U.S. Appl. No. 10/793,187, filed Mar. 4, 2004; Confirmation No. 3802.
Office Action (Mail Date Jun. 30, 2008) for U.S. Appl. No. 10/793,187, filed Mar. 4, 2004; Confirmation No. 3802.
Office Action (Mail Date Feb. 25, 2009) for U.S. Appl. No. 10/793,187, filed Mar. 4, 2004; Confirmation No. 3802.
Final Office Action (Mail Date Oct. 16, 2009) for U.S. Appl. No. 10/793,187, filed Mar. 4, 2004; Confirmation No. 3802.
Valacich, J.S.; "Essentials of Systems Analysis and Design", 2nd Edition, 2001, Pearson Education, Inc., pp. 1-18.
Notice of Allowance (Mail Date Mar. 12, 2012) for U.S. Appl. No. 12/498,578, filed Jul. 7, 2009; Confirmation No. 8659.
Fletcher-McDonald, Trina; The buying connection; InfoWorld vol. 21, No. 29; Jul. 19, 1999; 13 pages.
Office Action (Mail Date Jan. 30, 2012) for U.S. Appl. No. 12/498,578, filed Jul. 7, 2009; Confirmation No. 8659.
Excerpt from U.S. Appl. No. 60/183,067, filed Feb. 16, 2000; 2 pages.
Office Action (Mail Date Aug. 31, 2011) for U.S. Appl. No. 12/498,578, filed Jul. 7, 2009; Confirmation No. 8659.

* cited by examiner

MANAGEMENT OF BUSINESS PROCESSES

This application is a continuation application claiming priority to Ser. No. 12/498,578, filed Jul. 7, 2009; which is a divisional of Ser. No. 09/757,771, filed Jan. 9, 2001, issued Jul. 14, 2009, U.S. Pat. No. 7,562,041.

FIELD OF THE INVENTION

This invention relates to the field of computer software and hardware. More specifically the invention relates to a method and apparatus for managing business processes.

BACKGROUND ART

In the current competitive business conditions, manufacturers and sellers of products seek to be as cost competitive as possible, while providing quick delivery of products that often must be customized. Thus, modern businesses desire a mechanism for obtaining the best prices, delivery dates and quality from their suppliers and distributors in turn. In the past sellers purchased the items they needed from suppliers by calling a number of suppliers to determine cost and delivery dates. This process is shown in FIG. 1, where supply chain partner 100 communicates with supply chain partner 110 individually by means of a phone or fax line 120. This method of procurement often proves to be time consuming and expensive. In order to become more competitive, sellers began to automate their supply chains in order to derive cost savings and better serve customers by improving the efficiency of the transactions between various supply chain partners. For reasons of implementation cost, only the largest companies in the supply chain process could automate transactions between supply chain partners. Typically such supply chain partners were only able to automate simple transactions such as purchase orders, invoices and payments. Moreover, such automation was done by automating the transaction process one individual company at a time. For example, if a company wanted to automate the process of purchasing products from a number of different suppliers, current system typically require the company to setup a mechanism for purchasing products with each individual supplier.

Electronic Data Interchanges:

Electronic data interchanges (EDI) have been used in the past by some companies to exchange transaction information with their supply chain partners. EDI is a standard format for exchanging business data, developed by the Data Interchange Standards Association and designated as American National Standards Institute standard X12. An EDI message contains a string of data elements, each of which represents one fact, such as a price or product model number, separated by a delimiter or character used to separate data items. The entire string is called a data segment and one or more data segments framed by a header and trailer form a transaction set, which is the EDI unit of transmission. A transaction set often consists of what would usually be contained in a typical business document or form. A problem with existing EDI solutions is that there are large set up and maintenance costs associated with EDI. For example, each company that wishes to communicate with another company using EDI must setup a connection with that company in order to establish an EDI connection to that company. Thus, if a company has 100 suppliers and 50 distributors, the company is required to setup 150 different EDI interfaces. This process is cumbersome and requires a prohibitive number of resources in order to adequately implement. In addition, EDI messages are static, batch messages that do not permit interactive business processes to be conducted in real time. EDI protocols do not establish a standard mechanism for linking a series of messages in a predefined logical workflow sequence over a period of time in order to implement a business process. Thus, there is a need for a system that requires substantially less resources for a company to implement, and that permits business processes comprised of multiple messages linked by a logical workflow to be managed over time. For example, there is a need for a cost effective way for supply chain partners to communicate and exchange business transaction information, and to structure processes using this information that are linked by workflows and managed over time. The lack of standardized electronic business interfaces in supply chains has created many difficulties for manufacturers, distributors, resellers, and end-users who are attempting to automate business transactions. The problem is particularly acute for supply chain partners trying to use the Internet as a business-to-business commerce tool. For example, some of the problems typically encountered include the following:

1. Manufacturers use complex processes to determine inventory levels and availability across the supply chain at any point in time that are often little more than guesses because there is no agreement on how part numbers are defined or how to make inventory inquiries of suppliers through a standard interface.

2. Manufacturers have no automated way of comparing vendor prices and availability.

3. Distributors, who provide technical support to their resellers on thousands of items, are concerned with a lack of product information standards that makes the distribution of such information expensive and difficult.

4. Resellers must maintain different ordering and return procedures and system interfaces to each distributor and direct manufacturer with whom they trade.

5. End-users have no way of ordering items or confirming orders and delivery dates through uniform templates and must revert to older procedures such as calling suppliers with orders.

6. None of the users has any way of checking for errors that may be present in their requests or in the responses to their requests.

Currently available transaction systems do not fully automate business transactions and do not facilitate transactions between multiple parties. The time and cost wasted by the need for manual exchange of business information and transactions by phone and fax results in lost or incorrect orders, late deliveries, high clerical and labor costs, excessive buffer and obsolete inventory costs, and low customer loyalty and retention. Moreover, currently available transaction systems only permit the transmission and exchange of static batch messages. An effort has been made to overcome these problems by several organizations in different industries. An example of such an organization is RosettaNet™, an independent, self-funded, non-profit consortium formed in 1998 for the development of supply chain automation standards and guidelines. These standards serve to align processes between supply chain partners for automatic, system-to-system exchange of business information and transactions, with a number of transactions between a first partner and a second partner. RosettaNet™ functions through business processes known in RosettaNet™ parlance as PIPs (Partner Interface Process), where a PIP is a sequence of standardized transactions to perform a particular business function, such as a product inquiry or a purchase. The PIPs specify the activities for each trading participant and allow for multiple transactions between one partner and another linked together in sequence. PIPs are designed to be performed in real time. In order to use the RosettaNet system, a business process is modeled in terms of a PIP, which is defined in two data dictionaries that provide technical specifications for products and business properties, including transaction properties, supply partner data and most business related activities. For example, a PIP may include all of the information needed to introduce a new product to another partner, gain approval and update the partner's system with the new product information.

Many PIPs require trading partners to exchange multiple messages in a defined sequence within specified time limits, with the combined interactive message exchanges comprising a complete business process. These PIPs and similar business process standards are different from EDI messages in that they are not simply static, one-time batch messages, but instead comprise a sequence of messages linked by a logical workflow and occurring in a predefined sequence over a period of time. This linkage of multiple interactive messages over a period of time enables complex business processes to be concluded between parties that cannot be accomplished through transmission of a single message or even a sequence of messages not linked by a logical workflow.

RosettaNet™, while an advance, suffers from two major deficiencies. First, RosettaNet™ only provides for one-to-one type transactions. There is no provision for transactions involving more than two parties. Consequently, there is no way to compare suppliers or integrate a number of dependent transactions with different suppliers. RosettaNet™ does not provide a way for a seller to gain access to real time information on the status of the seller's entire supply chain. RosettaNet™ does not provide for the deployment of PIPs throughout an entire supply chain, with the same PIPS used by all of the supply partners. Moreover, RosettaNet™ does not facilitate the exchange of data between the various members of the supply chain. There is also a need to avoid the intensive, custom efforts associated with multiple connections to individual computer systems. Second, RosettaNet™ does not provide a mechanism for monitoring and managing the business processes over time to insure that a business process is successfully completed between trading partners.

Due to the limitations of current systems, there is a need for an electronic business system that facilitates the implementation of supply chain processes through the exchange of messages linked in a logical workflow and occurring over time. There is a need for a single, seamless, process infrastructure to manage these messages and processes and the ability to integrate those processes with other trading participants. There is also a need to avoid the intensive, custom efforts associated with multiple connections to individual computer systems.

SUMMARY OF THE INVENTION

One embodiment of the invention provides a framework for facilitating the management of business processes between multiple trading participants. To utilize the infrastructure each trading participant connects to a centralized process management platform. Once a trading participant connects to the centralized process management platform the trading participant becomes a member of an electronic trading community. Members of the electronic trading community may utilize the process management platform as a conduit for sending and receiving over a period of time sequences of logically connected messages comprising business processes. Thus, the process management platform acts as an intermediary for each of the parties involved in a particular transaction. In one embodiment of the invention trading participants connect to the process management platform through process gateways. Each process gateway provides an interface for connecting to the process management platform and may be located at a facility associated with the trading participant or at a facility associated with the process management platform.

The process management platform is configured to provides a multiplicity of services and ensure that business process data and messages are transmitted from one trading participant to another in a uniform format that is understood by each trading participant involved in the transaction. If different trading participants utilize inconsistent formats, the process management platform converts the business process data or message to a format understood by the trading participant. If the business process data or message sent from one trading participant to another is already in the appropriate format (e.g., the data originated in a designated standard or was converted at the process gateway), the business process data or message is processed by the process management platform and forwarded to the receiving trading participant.

In one embodiment of the invention, business process data comprises a sequence of messages linked by a predefined workflow that collectively define the specifics of a particular business process. For example, business process data may utilize an open standard such as RosettaNet™ for defining common business processes. If the RosettaNet™ architecture is utilized, business process data is defined via partner interface process (PIP) guidelines. The PIP guidelines provide a uniform protocol for communicating information through a sequence of messages exchanged over a period of time to effectuate a particular business process. However, it is important to note that the invention contemplates the use of other formats and/or protocols for defining and effectuating business processes. For example, the process management platform may be configured to process proprietary transaction definition formats or any other format that defines a business process and/or transactions. Thus an embodiment of the invention provides a method and apparatus for facilitating business processes where business process data or messages are obtained from a trading participant, processed by a process management platform, and transmitted to a recipient by the process management platform. The recipient may, in turn, respond by providing business process data or messages comprising part of the sequence of messages that collectively comprise a business process.

DETAILED DESCRIPTION OF THE INVENTION

Figure 1:
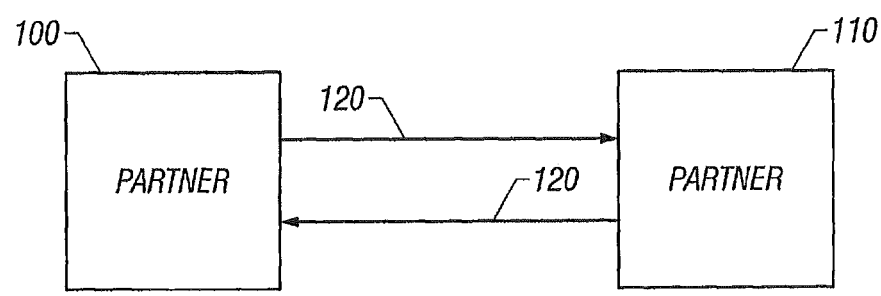
FIG. 1 illustrates how one trading participant may transmit electronic data from one trading participant to another.

An embodiment of the invention comprises a method and apparatus for facilitating business processes. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Business Model Overview:

One embodiment of the invention provides a framework for facilitating the management of business processes between multiple trading participants. To utilize the infrastructure each trading participant connects to a centralized process management platform. Once a trading participant connects to the centralized process management platform the trading participant becomes a member of an electronic trading community. Members of the electronic trading community may utilize the process management platform as a conduit for sending and receiving business process data and messages that comprise business processes. Thus, the process management platform acts as an intermediary for each of the parties involved in a particular transaction. In one embodiment of the invention trading participants connect to the process management platform through process gateways. Each process gateways provide an interface for connecting to the process management platform and may be located at a facility associated with the trading participant or at a facility associated with the process management platform.

The process management platform is configured to provides a multiplicity of services and ensure that business process data is transmitted from one trading participant to another in a uniform format that is understood by each trading participant involved in the transaction and that facilitates the successful completion of the desired business process. If different trading participants utilize inconsistent formats, the process management platform converts the business process data to a format understood by the trading participant. If the business process data sent from one trading participant to another is already in the appropriate format (e.g., the data originated in a designated standard or was converted at the process gateway), the business process data is processed by the process management platform and forwarded to the receiving trading participant.

In one embodiment of the invention, business process data comprises a sequence of messages linked by a predefined workflow and collectively defining a particular business process. For example, business process data may utilize an open standard such as RosettaNet™ for defining common business processes. If the RosettaNet™ architecture is utilized, business process data is defined via partner interface process (PIP) guidelines. The PIP guidelines provide a uniform protocol for communicating messages in a predefined sequence over time in order to enable the completion of a business process. However, it is important to note that the invention contemplates the use of other formats and/or protocols for defining business processes. For example, the process management platform may be configured to process proprietary process definition formats or any other format that defines a business process.

Business Process Data:

Business process data, as it is utilized by one embodiment of the invention comprises a sequence of messages linked by a predefined workflow and. exchanged over a predefined period of time that collectively define the specific components and transactions required to enable a business process. Thus, business process data provides the information needed to enable system-to system automation of supply chain processes, including catalog management, ordering, inventory management, customer service and support, and any other business process companies have a need to perform. Each business process defines the type of messages that will be sent and received during the course of a particular business transaction. For example, when a business process message is sent, there may be a defined response that will be forthcoming within a specific period of time. Once such a response is received a reply to that response may be transmitted within a specified period of time. Thus, the parameters of the business process may be defined in accordance with a set of business rules and the messages and responses sent back and for the between the trading participants are closely associated with the business rules. Each set of business process messages is therefore linked by a logical workflow that occurs over time.

There may be different types of business process data where each type defines a different business process. For example, in one embodiment of the invention different processes are defined via Partner Interface Processes (PIPs) as they are implemented in accordance with the RosettaNet™ implementation framework. An example of the RosettaNet™ framework can be found in the RosettaNet™ Implementation Framework Specification, Version 1.1 which is incorporated herein by reference. However, the invention contemplates the utilization of other such frameworks and may be implemented via any framework that defines a particular business process.

In one embodiment of the invention, business process data is transmitted in discrete packages where each package or a sequence of packages represents a component or aspects of the business process. For example, PIPs may be encapsulated in TCP/IP packets and sent through the process management platform for handling. In one embodiment, the business process data comprises a sequence of messages that collectively comprise a RosettaNet™ PIP, where each PIP provides common business/data models and documents enabling developers to implement a common interface. However, trading participant are not required to utilize the RosettaNet™ framework and may instead send data in a different format (e.g., one derived by a legacy system). In such instances, the process gateway or the process management platform converts the business data to a format understood by the recipient before transmitting the data to another trading participant. Such conversions are transparent to the user and thereby the system allows clients with legacy systems to coexist with clients having system subscribing to the RosettaNet™ standard.

The following table comprises a list of sample PIPs that the system may utilize in accordance with one embodiment of the invention.

The invention contemplates the use of any of the defined PIPs and/or any other business process that is defined with a set of specific parameters. Some further examples of PIPs can be found in section A. For example, the invention contemplates the use of each of the PIPs published in the RosettaNet PIP Development Schedule which is incorporated herein by reference. PIP 1A2, for example, contains information required to maintain account status between trading participants. Maintenance of account information includes such activities as updating ship-to and bill-to locations as well as updating relationships between ship-to and bill-to address.

The Partner Interface Process supports both customer and vendor account types. For example, assume that trading participant ABC purchases products from trading participant Acme. If trading participant ABC decides to open a new warehouse, ABC would initiate PIP 1A2 to report the new warehouse location to trading participant Acme. Acme would update the customer account in their system with the new location and provide an acknowledgment back to trading participant ABC. Conversely, Acme may add a new address to which purchase orders should be sent. As a result, Acme would use PIP 1A2 to advise ABC of this new address. ABC would add the purchase order address to the vendor account and acknowledge the addition(s) back to Acme.

In one embodiment, PIP 1A2 allows trading participants to determine what, if any, of the updated account information is accepted and reflected in their system. Thus, referencing the example, ABC might report the new warehouse location and a new bill-to location to Acme. However, Acme must review the updates and decide which information to change in their system. If Acme finds that ABCs new bill-to location already exists in their system, then Acme would reject that portion of the request and notify ABC of the rejection. PIP 1A2 allows an Account Provider to accept part of a request and reject part of a request, so that the recipient could reject the bill-to, but accept the warehouse location within the same PIP. This scenario is one example of the type of business processes that may be defined by PIPs. However, the system may operate upon any other type of business process data or messages that defines a business process. Business processes that may be defined are not limited to vendors and customers, but could be defined between and among a variety of types of trading participants.

Figure 2:
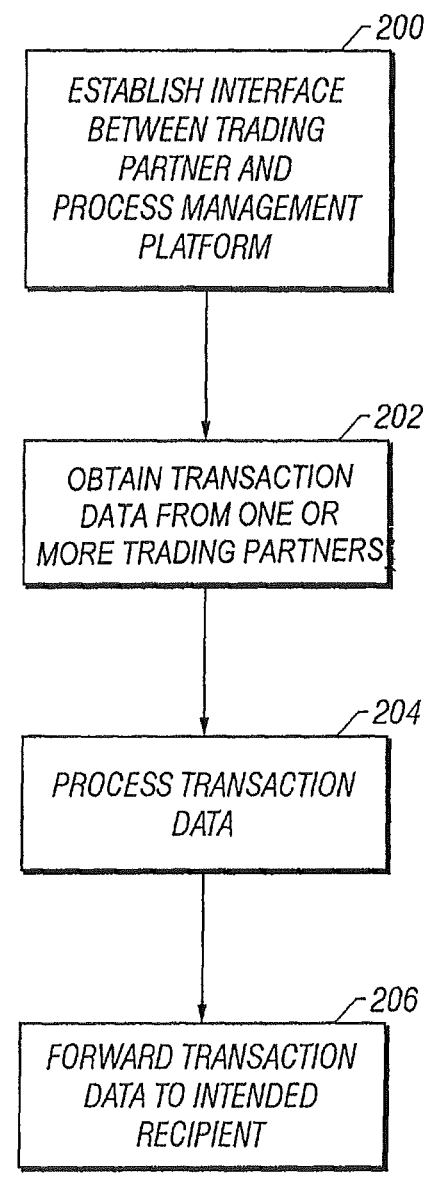
FIG. 2 illustrates the process for processing business process data in accordance with one embodiment of the invention.

FIG. 2 illustrates the process for processing business process data in accordance with one embodiment of the invention. The process begins at step 200 when a trading participant establishes an interface with the process management platform. Each trading participant may establish such connectivity by connecting new or existing business systems to a process gateway. A trading participant may, for example, connect a legacy system to the process gateway and utilize the process management platform to forward business process data to another trading participant in a uniform format.

In one embodiment of the invention, once a process gateway provides connectivity to the trading participant, an interface for transmitting business processes between multiple trading partners is established. This business process interface comprises a conduit for communicating business process messages and data from one trading participant to one or many other trading participants in order to enable business processes. Once the trading participant has access to the business process interface, the process management platform may obtain business process data from one or more trading participants (e.g., at step 202) in order to effectuate business processes with those trading participant(s). Each trading participant may be referred to as a trading participant. A trading participant is may comprise any type of business entity that has a need for communicating business process data with another business entity.

At step 204, the process management platform processes the business process data. In one embodiment of the invention, the process management platform processes the business process data by evaluating the relevant portions of the business process data and forwarding it to the intended recipient (e.g., step 206). The process management platform also provides other services that are discussed in further detail below. However, in an embodiment of the invention the process management platform is extensible and may therefore act as an intermediary to facilitate any type of transaction or process carried out between two or more parties. For example, the process management platform may combined multiple business processes to formulate a metaprocess. A metaprocess is combination of one or more processes that is formulated at the process management platform.

The process management platform may be distributed across multiple locations and or hardware devices and utilize redundant system that ensure the maximum amount of uptime.

Figure 3:
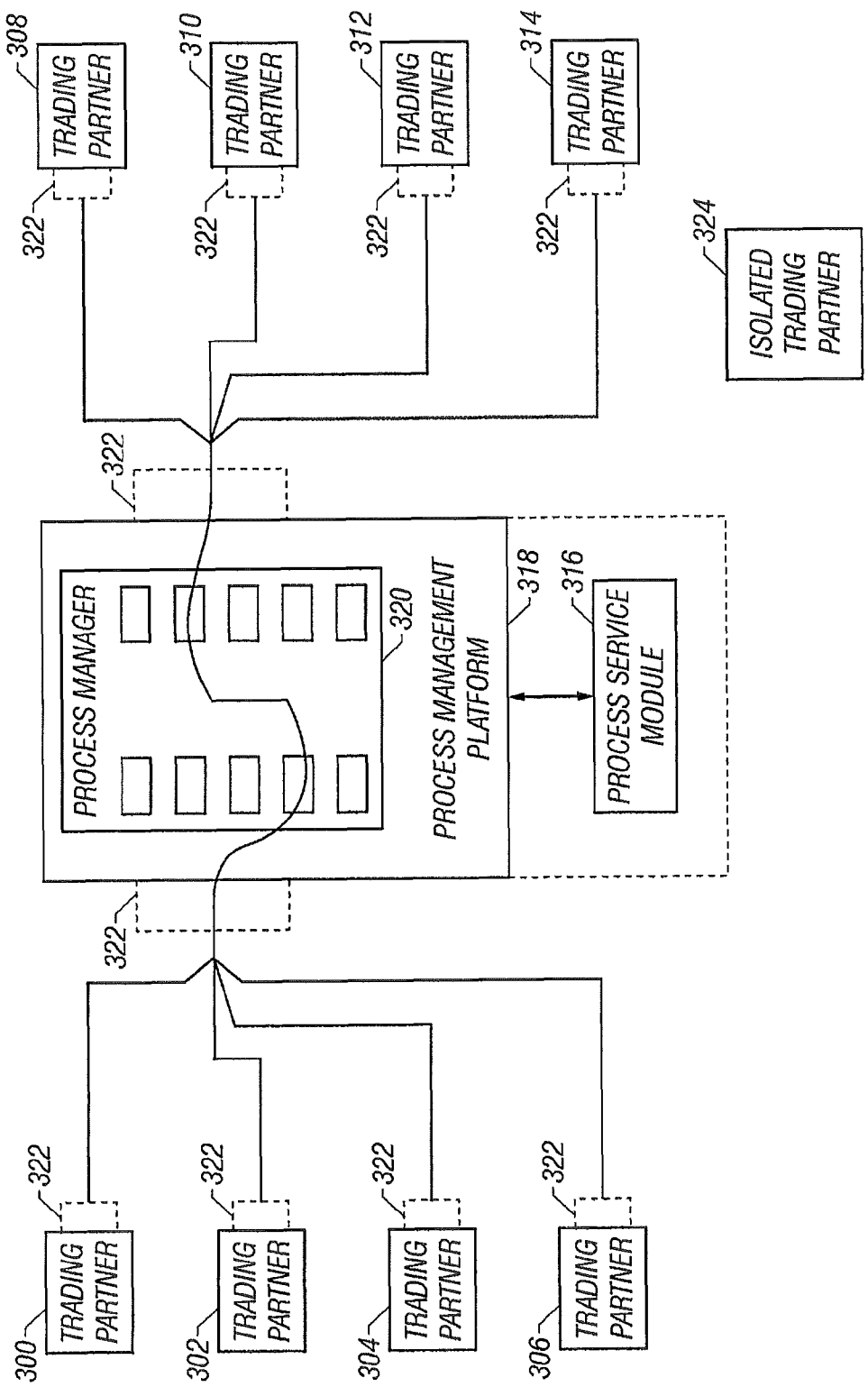
FIG. 3 illustrates the infrastructure utilized to provide business process services to members of the electronic trading community.

System Infrastructure:

FIG. 3 illustrates the infrastructure utilized to provide business process services to members of the electronic trading community in accordance with one embodiment of the invention. The electronic trading community is comprised of multiple trading participants 300-314. A trading participant becomes a member of the electronic trading community when the trading participant connects to process management platform 318.

Trading participants that are not connected to process management platform 318 are isolated from member trading participants 300-314 and not able to exchange electronic business process data or messages with member trading participants 300-314. For example, trading participant 324 cannot electronically exchange data with member trading participants 300-314. Therefore trading participant 324 must utilize traditional communication mechanisms such as facsimile, telephone, or EDI to communicate with other trading participants in electronic form, and cannot utilize the business process interface to exchange messages in a predefined sequence over a period of time in order to enable a business process.

If trading participant 324 wishes to establish an electronic communication link with each member trading participant 300-314, trading participant 324 is required to establish individual connections with each trading participant 300-314. However, if trading participant 324 were to join the electronic trading community, trading participant would be able to communicate with trading participants 300-314.

Figure 4:
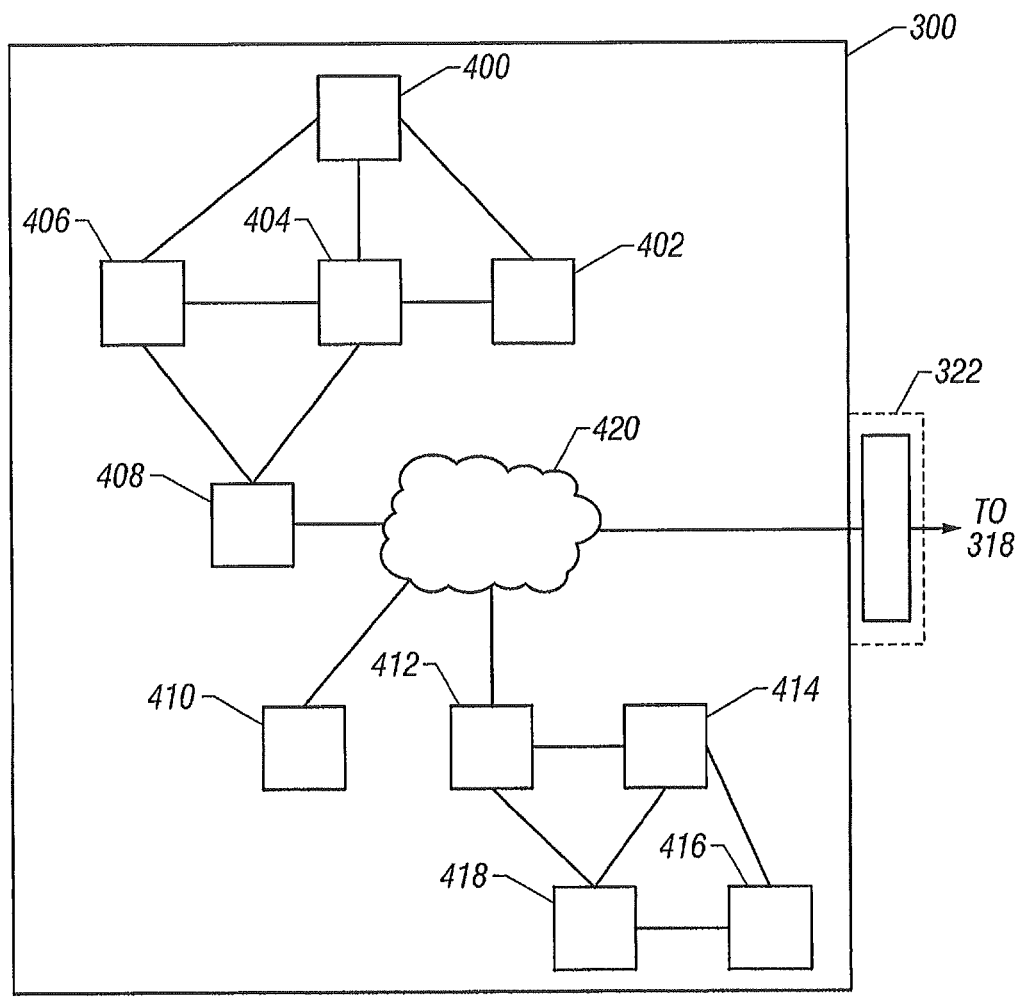
FIG. 4 illustrates the structural components of a trading participant in accordance with one embodiment of the invention.

Trading Participants:

FIG. 4 illustrates the structural components of a trading participant in accordance with one embodiment of the invention. Trading participant 300 comprises an entity, organization, business, or individual having a need to conduct business processes with other trading participants 302-314. For example, trading participant 300 may be an entity that purchases, sells, supplies, and/or distributes products and/or services. In other instances a trading participant represents any party involved in a business process.

Trading participant 300 may comprise multiple network nodes 400-418 or it may comprise a single network node such as node 410. Each node represents an individual computer or a network of interconnected computers configured to transmit and receive business process data. Nodes 400-418 may communicate with one another across any type of interconnection fabric 420. In one embodiment the invention contemplates the use of various types of communication interconnects. For example, embodiments of the invention may transmit data from one node to another via any type of interconnection fabric that provides a mechanism for transmitting and/or receiving data. In one or more embodiments of the invention, data is sent across an interconnection fabric that comprises any of multiple suitable communication paths for carrying data between multiple computational devices. The interconnect fabric may be, for example, a local area network, a wide area network, a virtual private network (VPN), the Internet, an Intranet, a wireless network, or any other type of interconnect capable of sending data from one device to another. The interconnect fabric may be implemented with a physical medium such as a wire or fiber optic cable, or it may be implemented in a wireless environment using microwave signals, light signals, or any other type of wireless communication mechanism.

Process Gateways:

Referring back to FIG. 3, trading participant 300 is configured to transmit business process data to process gateway 322. Process gateway 322 is associated with trading participant 300 (or any other trading participant sending or receiving data) and may be at a location physically or virtually associated with the trading participant to which the gateway corresponds. Business process data sent from each trading participant is transmitted through a process gateway across an interconnection fabric to the process management platform. Each process gateway may also provide encryption/decryption services so as to ensure that business process data sent to and from the process management platform remains entirely confidential and only known to the parties actually involved in the business process. For example, if one trading participant wishes to transmit data through the process management platform in a secure manner to another trading participant, the payload data may be encrypted at the process gateway. The header associated with the business process data is, however, not encrypted so that the process management platform may utilize the header to determine where to route the data and what management services may be required to manage and enable the successful completion of the business process.

Process Management Platform:

Process management platform 318 comprises a system configured to evaluate and/or route business process data. The process management platform has access to process service module 316. Process service module 316 is configured to perform a variety of different operations on the business process data. However, if no such operations are desired, the business process data if forwarded by process manager 320 to the appropriate trading party. For example, if trading participant 320 transmits appropriately formatted business process data to process management platform 318, process management platform will provide the business process data to process manager 320. Otherwise, process manager 320 evaluates the business process data, determines which trading participant is the intended recipient and forwards the business process data to the receiving party. Thus, in one embodiment of the invention the process manager acts as a switch for routing business process data.

The process manager, may for example, analyze the header of packets comprising the business process data, determine that the information contained therein is compatible with the intended recipient and forward to the business process data to the intended recipient on behalf of the initiating supply chains participant.

The process management platform provides many benefits to the trading participants connected to the platform. For example, process management platform 318 eliminates the need for a series of potentially expensive and time-consuming one-to-one transactions or data exchanges. In addition, process management platform 318 provides centralized management, reporting and maintenance services to support business processes. For example, where the business process standard used by the trading participants specifies a sequence of messages that must be exchanged within a specified time period in order to complete a business process, the process management platform can identify when a required message has not been sent within the required time frame and can notify the trading participants or take other actions to facilitate the successful completion of the business process. The business process management platform can also troubleshoot other problems with messages between trading participants and take corrective action in real time to prevent or minimize delays or disruptions in the completion of the desired business process.

The experience gained by having one entity administer a central process management platform will help ensure connectivity and flawless operation. In addition, that entity is ideally suited to provide assistance to new users. A process management platform facilitates the deployment of business process data throughout an entire supply chain, with the same (or a subset of) business processes being used by all of the supply partners. Furthermore, the addition of each trading participant to the process management platform makes the process management platform more valuable to all of the companies in the supply chain. For example, each trading participant provides another company with which currently connected trading participants may send and receive data in order to effectuate business processes. Also, the use of a process management platform facilitates the rapid addition or replacement of supply chain partners. Thus, process management platform 318 acts as the intermediary through which business process data transmitted from one trading participant to another is sent.

In one embodiment of the invention, process management platform comprises service module 316 and process manager 320. Process service module 316 is configured to provide services to the trading participants. Each of these services is designed to facilitate communication about current or future business transactions. Process manager 320 provides a physical interface between trading participants and hosts the services of process service module 316. Functions allocated to process management platform 318 may be performed at a single central location, or may be distributed across multiple sites and/or computational devices.

If the services are distributed, an interconnection fabric (e.g., the Internet) can be used to communicate between the services and devices as required. These software and hardware solutions define the electronic trading community, which implements communication using a uniform transaction format. For example, in one embodiment of the invention, the electronic trading community utilizes RosettaNet™ to impose efficiency on the business process model. However, an embodiment of the invention contemplates the utilization of other open or proprietary protocols that define business processes. Thus, the present invention encompasses additional enterprise activities that fall outside the scope of the RosettaNet™ model. For example, the process management platform may offer extensions to the RosettaNet™ model and/or vary the contents of PIPs implemented using the RosettaNet™ model.

Many business processes are currently performed with propriety hardware and software tools or without any automation at all. The process management platform provides a centralized mechanism for automating such business processes and provides access to each party involved in the transaction through an interconnection fabric such as the Web. Business processes such as product configuration, sales reporting, transportation and distribution, marketing information management, collaborative forecasting, and price protection can all be automated using an embodiment of the present invention.

The following services are described herein as examples of the functions that may be performed by process service module 316: business process data routing, business process data translation and conversion, broadcast to multiple trading participants, archiving of data, real-time troubleshooting and correction of problems that might otherwise prevent or delay completion of the desired business process, transaction evaluation and analysis reporting, directory services, automatic negotiation of trading participant agreements, and automatic client billing services. However, it is important to note that embodiments of the invention may be utilized to implement other business processes. For example, process management platform 318 may implement various aspects or extensions of the RosettaNet™ model and/or similar business process definition protocols.

Thus, while the following examples describes certain services, infrastructure, and processes that support the electronic trading community described herein, it will be clear to one of ordinary skill in the art that the invention is not limited to the services or protocols used as examples of the present invention. RosettaNet™, for example, facilitates the functions performed by the present invention, but the invention is not limited by or to the RosettaNet™ protocol. Any protocol standard designed to facilitate the enablement of business processes through the communication and management of a sequence of messages between businesses over time would meet the requirements of a communications protocol that may be managed by the process management platform. An embodiment of the invention comprises a virtually centralize resource of services for trading participants which facilitates their involvement in the electronic trading community.

Figure 6:
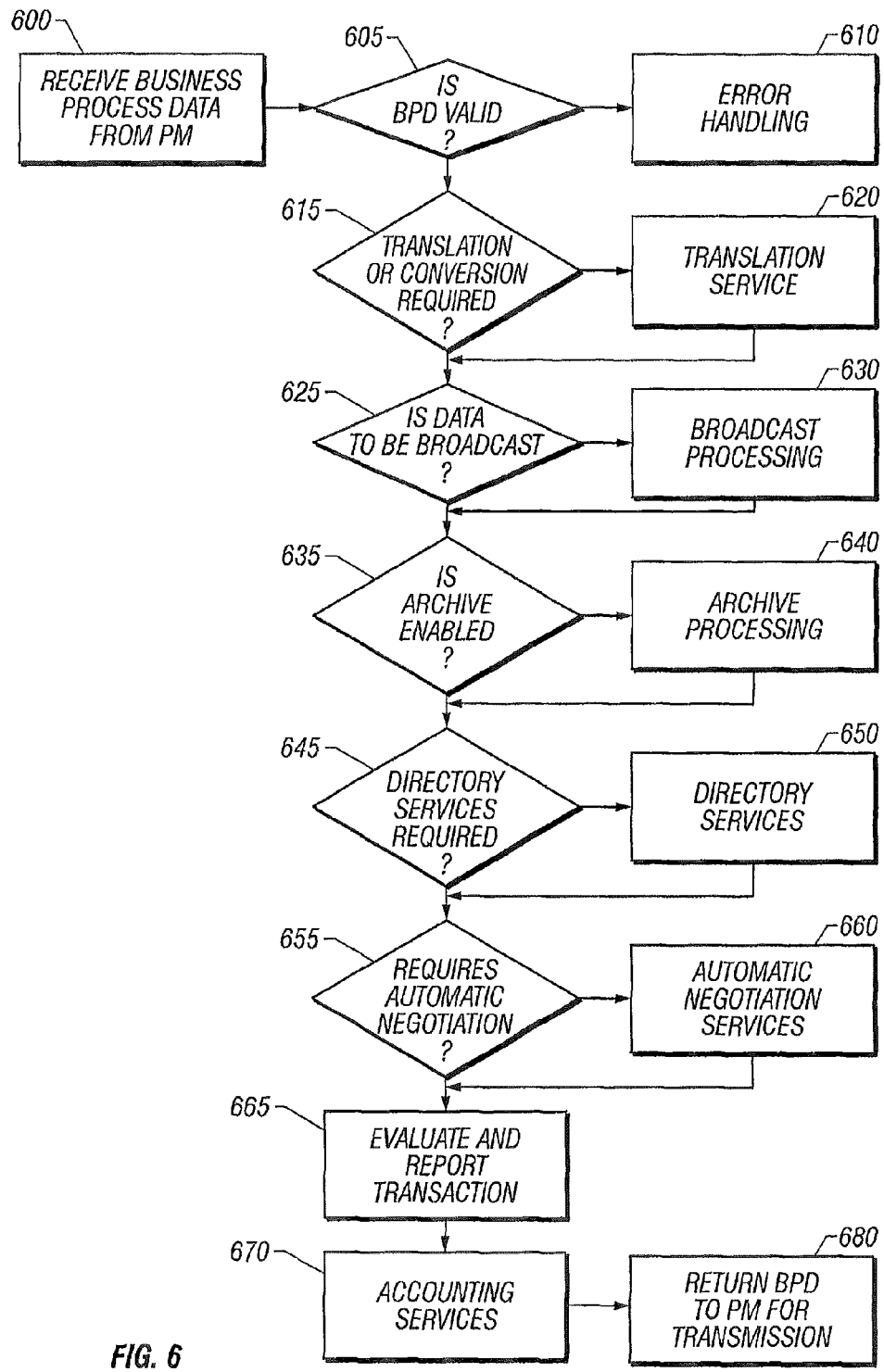
FIG. 6 illustrates the overall process flow of process management platform 318 and shows the relationship between the services provided by Process Service Module 316.

FIG. 6 illustrates the overall process flow of the process management platform and shows the relationship between the services provided by the process service module in accordance with one embodiment of the invention. Process module 320 begins processing when business process data is received at process management platform 318 and passed to process module 320. When processing is complete, process service module 316 transmits the message via process manager 320. At step 600, the business process data is identified as a received message. The business process data is tested for validity at step 605 by examining its header and error correction information. The business process data may also be authenticated at step 605 to verify the identity of the sender. In addition, if the message encapsulating the business process data contains one or more digital signatures then those signatures may be verified at step 605. If the message is invalid, it passes to error processing function 610. Alternatively, if the message is repairable it continues in the processing chain. If the message is unrecoverable, it is logged by error handling 610 and process management platform 318 waits for the next message.

Step 615 test the valid business process data message to determine if the message requires and translation and/or conversion. Translation and/or conversion may be required when the sender and receiver are using incompatible systems or protocols. In such instances, the incompatible business process data is passed to translation service 620. Translation service 620 converts data sent in a first protocol or format to data that conforms to a second protocol or format. For example, if the business process data was sent using an older RosettaNet™ protocol and the recipient is configured to utilize a new RosettaNet™ protocol, translation service 620 will convert the data from the first protocol into the second protocol. When an acknowledgement or reply is sent back the translation may be performed again so that each party involved in the transaction can receive the data in the format understood by that party. If the message requires decryption, translation services 620 may also perform this function. When translation service 620 is complete, the data is tested for a broadcast indication at step 625.

Step 630 operates upon business process data that requires broadcasting. Broadcasting may comprise alterations to the business process data header, or may require process management platform 318 to transmit a plurality of copies of the business process data to multiple trading participants, or may require process management platform 318 to apply logic to the incoming business process data and initiate a new or different message to multiple trading partner participants in order to effectuate the desired business process. Depending on the criteria specified in the business process data and the criteria specified by the potential recipients. For example, the business process data may contain an indication that the data is to be broadcast to a list of suppliers that carry a particular type of product. The supplier may respond by sending a reply message (e.g., a price quote) to the trading participant that initiated the connection.

In accordance with one embodiment of the invention, the authenticity or origin of the message may optionally be validated at step 631 by checking the message against a digital signature or other type of unique identifying mechanism. If the signature or unique identifier is not valid, the message is not routed to the intended destination. In the event that the message is determined to be valid, it is then forwarded to the appropriate destination for processing.

Step 635 tests if the archiving function is enabled. If so, then the business process data is passed to archive processing 640, which records information on the transaction. This step is an important part of the non-repudiation function provided by process service module 316. When a business process message has been archived a record is made of the transaction defined by that business process message. Thus, archiving function provides a record, made in the ordinary course of business, of the sequence of messages transmitted that comprise a business process. This is an improvement over prior transaction methods, which often utilized additional mechanism such as the telephone, email, or fax to memorialize a transaction.

Many trading participants use more than one method of communication at different times during a business process or negotiation. Using different methods of communication for various steps in a business process may make indexing and recording of the communications unreliable or hard to trace. By archiving business process data in process management platform 318 a complete electronic index and record of business processes sent between trading participants can be maintained and made accessible.

Business process data may be examined at step 645 to see if the data requires a listing in directory services 650. Directory Services 650 comprises a directory of information for connecting to, selecting, or obtain information about other trading participants. For example, the directory may contain information on products and/or services offered for sale, business process standards used by trading participants, and the types of business processes that a trading participant is capable of undertaking.

Next process service module 316 may examine the business process data at step 655 to determine if the message requests automatic negotiation of a business process. Automatic negotiation 660 is a service provided by process management platform 318 that can initiate and consummate a business process without human intervention. Using a uniform translation format such as RosettaNet™ and data provided by the purchaser process service module 316 can create a request for offers, evaluate the responses, and "make the deal." In one embodiment of the invention, the purchaser uses PIPs to specify to process service module 316 the item acquisition data, technical data, and other information required to describe the desired transaction. Automatic negotiation 660 then sends PIPs requesting offers of the specified items at the required price, quality and quantity. Process service module 316 continues to exchange PIPs with trading participants through their process gateways until an offer satisfying the criteria of the item acquisition data is received. Automatic negotiation 660 then accepts the transaction. Confirmation of the transaction is forwarded to the trading participant initiating automatic negotiation 660.

Another service provided by process service module 316 is that of Transaction Evaluation and Analysis Reporting ('PEAR) 665. TEAR 665 is a service provided to subscribing trading participants that keeps them informed about sales and marketing trends. Transactions passing through the present invention are evaluated for statistical purposes comprising transaction type, pricing, and other related information. The statistical data gathered is then analyzed and formatted to produce market trend and forecasting reports for interested trading participants.

When process service module completes processing the business data the system gathers and processes the data required to provide account service information to the trading participants involved in the business process. This function may be performed by accounting services 670. Following message processing and accounting the business process data is returned by process service module 316 to process module 320 for transmission to all trading participants identified as recipients of the message. The following sections detail the functions of the present invention identified in FIG. 6.

Business Process Data Validation and Routing

Figure 7:
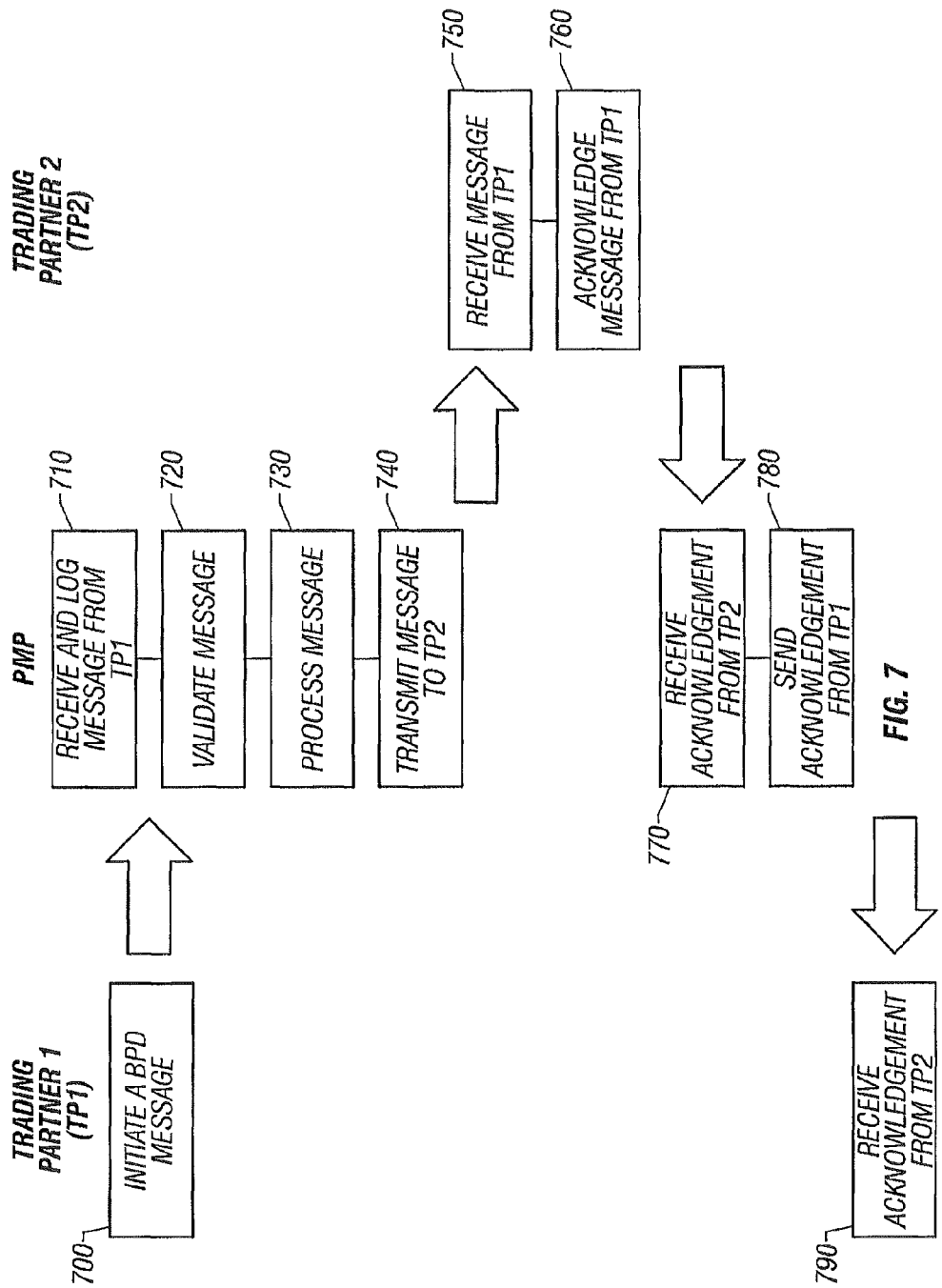
FIG. 7 illustrates the validation and routing performed by one embodiment of the invention.

The Business Process Data Validation and Routing service, in one embodiment of the invention, provides a mechanism for trading participants to seamlessly and reliably conduct business processes with other trading participants—even if those other partners change their computer systems, locations, business process data message protocol version, or other information critical to communications sent via the electronic trading community. The validation and routing performed by one embodiment of the invention to accomplish these goals is illustrated in FIG. 7.

Business process data message routing and validation begins with the initiation of a message comprising the first step in a business process. Messages may be in the nature of specific transaction data, or may be a request for broadcast of service and/or product information. Messages may also occur between process management platform 318 and the trading participant directly, such as a request for a new product to be advertised in the directory service, providing process management platform 318 information on changes to the trading participant's system, or other account maintenance information.

Messages may be initiated by a trading participant or by process management platform 318. For example, a trading participant may initiate a message to propose a business process. Process management platform 318, on the other hand, may initiate a message to perform automatic negotiation services 660 functions. If a trading participant initiates a transaction it may be through an automated system interface—computer to computer—or through a human system interface such as a Web browser.

The business process data is transmitted between trading participants and process management platform 318 using any interconnection fabric interface. In one embodiment of the invention, the message is transmitted using a standard Internet protocol such as TCP/IP. In another embodiment, the message is transmitted via wireless protocols. As will be well understood by those of ordinary skill in the art, the present invention performs equally using all methods for transmitting messages between trading participants and process management platform 318.

FIG. 7 illustrates an example of the business process data validation and routing process. In this example, trading participant 1 (trading participant 1) initiates a message to trading participant 2 (trading participant 2) at step 700. The message is received by process management platform 318 and immediately logged. This logging process, at step 710, ensures that if a failure occurs before the message is transmitted on to its destination, in this example trading participant 2, that it will be available for reprocessing—ensuring reliability of the transfer through process management platform 318. The logging of messages received also provides information for other services in process management platform 318 such as accounting services 670.

After logging the message, process management platform 318 validates the message (e.g., the business process data) at step 720. Message validation involves a number of tests. The first test of step 720 includes verifying the physical transmission of the message. This test may be performed using Cyclic Redundancy Checks (CRC), or any other method that can be used to verify the integrity of the message itself. Unneeded message header and tail information is then stripped from the message, and the next validation test is performed. The next validation test may be authentication of the identity of the sender of message. One service provided by process management platform 318 is to ensure authentication of the transaction for trading participants. This capability of process module 318 is performed in step 720. In addition, the message may contain a digital signature. If so, the invention may validate the signature as part of accepting the identity of the sender.

Other checks may include validating the uniform transaction format of the message. For example, one embodiment of the invention validates a RosettaNet™ message for grammar and sequence validation.

If process management platform 318 alters a message in any way, including correcting transmission errors using built-in error correction information, it may be required to "sign" the message before passing it on to its recipient.

Following validation the message is processed at step 730 in the manner described above and illustrated in FIG. 6. When message processing is complete, process management platform 318 transmits the message to trading participant 2 as illustrated at step 740.

The message, converted and translated if required, is received by trading participant 2 at step 750. Trading participant 2 typically acknowledges receipt of the message using uniform transaction format commands. Trading participant sends this acknowledgement to process management platform 318 at step 760. Process management platform 318 receives an acknowledgement at step 770, and formulates an acknowledgement that can be understood by trading participant 1 at step 780. This acknowledgment is sent at 780 and is received at step 790. When step 790 completes trading participant 1 can be assured that its message was delivered to trading participant 2 in a format trading participant 2 can understand. If trading participant 2 wishes to respond to the message it can begin a new transaction at step 700, where the two trading participants trade roles.

Business Process Data Translation/Conversion

Another function of process management platform 318, provided by process service module 316, is to translate or convert message formats as required. A single message may require a number of different conversions and translations.

This poses a problem for the trading participants. Product announcements, for example, are very inefficient if they need to be translated into different formats for each trading participant to which they are sent. An embodiment of the present invention is capable of translating or converting messages under at least the following circumstances. The purpose of this function in one embodiment of the invention is to normalize a message so that both sender and recipient can process any message transparent to any differences between their respective systems.

Encryption:

Business process data may arrive at process service module 316 encrypted. Encryption is a process by which data may be altered so that only its intended recipient can interpret it. If a message arrives at process service module 316 encrypted, and the intended recipient cannot, according to its profile, process encrypted data in the form in which the message was received then process service module 316 can decrypt and then re-encrypt the message in a format understandable by the recipient. Process service module 316 performs this service by managing encryption data for all registered trading participants.

Protocol Translation:

Another form of translation service performed by process service module 316 is to translate between different business process data formats. For example, trading participant 1 may have a system that uses the EDI format for exchanging business process data. Under the present art, that trading participant cannot electronically process orders from trading participant 2, who uses RosettaNet™ if its system only understand EDI. Other examples of uniform transactions protocols include CxML and CBL. An embodiment of the invention provides a solution to this problem by providing protocol translation. For instance, the process management platform may uses table-lookup, database methods, and other methods to seamlessly translate messages from a uniform transaction format understood by trading participant 1 to the format understood by trading participant 2. The information on what transaction format or formats each trading participant understands may be maintained by process service module 316 in a trading participant profile database.

Protocol Version Conversion:

Another problem an embodiment of the invention solves occurs when trading participant 1 and trading participant 2 both use the same uniform business process protocol, but they use different versions of that protocol. For example, Rosetta-Net™ version 1.1 and version 2.0 are very different. A trading participant using one would not be able to seamlessly communicate transaction data with a trading participant using the other. Another function of the translation and conversion service is to use a table-lookup or similar method to translate between versions of a uniform transaction protocol. The present invention can provide this service invisibly to the trading participants, because the invention has available to it information on the capabilities of each trading participant in the trading participant profile database. Even within a single version of a single uniform business process format, different trading participants may have come to different interpretations of various messages in the format. For example using RosettaNet™, two trading participants both using version 2.0 may have come to understand a different meaning for PIP Legacy Systems:

Another challenge to communications sent through the electronic trading community occurs when one trading participant has a much older computer system than another. The two trading participants may wish to do business electronically, but their systems may not be able to communicate.

Another function of the translation and conversion service is to facilitate the communication between these two trading participants. By utilizing the process management platform, an embodiment of the invention can easily handle the interface between a Legacy system and a modern system, without either system being required to handle the differences between them.

Broadcast to Multiple Trading Participants:

An embodiment of the present invention also defines the ability to broadcast messages between trading participants. This service is provided to allow broadcast of messages for any purpose. In current systems, broadcasting messages is difficult because of many considerations including trading participants using legacy systems, using different versions of communications protocols such as RosettaNet™, and lack of information on the ever-changing types of systems used by each potential trading participant, as detailed in the section above.

However, the ability to broadcast data is desirable because it can facilitate business processes. For example, in one embodiment of the present invention a trading participant may desire to broadcast messages a new product announcement. The trading participant may send a message to process service module 316 instructing it to broadcast the product announcement to all available trading participants. Process service module 316 would then examine the profile database to determine which trading participants are interested in such a product, and then replicate the message, in a format acceptable to each, and "broadcast" the announcement as instructed. The recipient trading partners would then be able to send an acknowledgement back to process service module 316 for routing to the initiating trading participant, acknowledging receipt of the product announcement. The translation and profile data known by process service module 316, as described above, allows the present invention to provide a seamless interface for broadcasting data to multiple trading participants.

Figure 8:
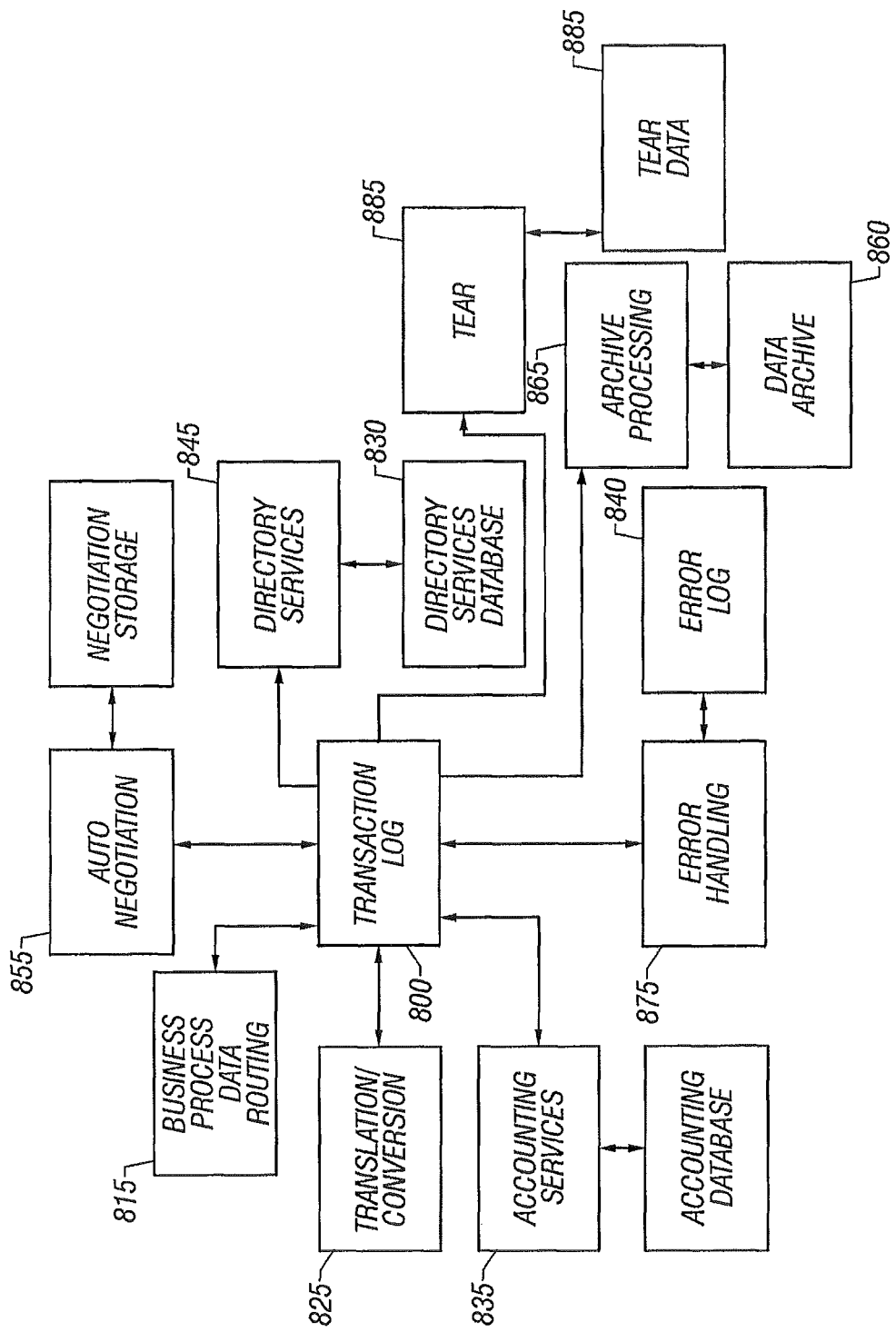
FIG. 8 illustrates the relationship of the archive data service to the data stores in accordance with one embodiment of the present invention.

Archive Data:

A. Transaction Archiving:

Business process archiving provides one of the present invention's advances over existing methods of business transaction negotiations. Because all communications comprising a business process pass through process management platform 318 the present invention may store the all of the messages comprising or related to a business process in an archive data store. FIG. 8 illustrates the relationship of the archive data service to the data stores of the present invention. Archive processing 865 may read transaction log 800, and may store information in data archive 860. This data store is a repository of all the elements of the business process, including negotiation of terms, price, quantity, quality, item acquisition data, item technical information, and delivery agreements.

Archiving business process data provides a record of the "deal" to both participants. If either participant tries to "repudiate" (break the agreement) then the other participant can use the data stored in the data archive to prove the details of the agreement in a legal proceeding. This information is stored by the present invention in the form of a transaction log. Items are added to the transaction log when received, as discussed in the description of step 605 above. Archive data can be maintained for a certain time interval. For example, the data may be maintained for seven years or longer to support non-repudiation and legal archiving needs. Data in the data archive store may be indexed to make it more accessible.

B. Data Mining:

Business Process Data transaction information may also be stored to support the transaction evaluation and analysis report service. Transactions that are archived by the invention may be "mined" by software programs to generate statistical information useful in predicting market trends, forecasting supply and demand, and in evaluating pricing issues. Data mining is a process by which software programs scan databases for certain types of information, and then manipulate that information mathematically to produce summary information.

Transactions Evaluation and Analysis Report (TEAR):

One of the services the present invention provides to trading participants is the ability to garner market treads from statistical information. The present invention may monitor and process transaction data passing through the invention's infrastructure that is stored in transaction log 800. This information may be processed in a way that protects the confidential information of the trading participants, and still provides information on market trends of interest to other trading participants.

For example, in one embodiment of the invention transactions evaluation and analysis reporting service 885 monitors transaction log 800 for entries related to the price of a particular computer hard disk drive. When transactions between trading participants regarding price negotiations of an item matching the specification of the particular computer hard disk drive are detected transactions evaluation and analysis reporting service 885 copies this entry into its own data store, transactions evaluation and analysis reporting database 850. When a report on hard disk prices is required, a query is run on transactions evaluation and analysis reporting database 850 to produce information on the highest, lowest and media price of the particular computer hard disk drive over a particular period. This information can then be provided to interested trading participants.

Directory Services:

In one embodiment of the invention, the invention contemplates the use of a directory. The directory is generated by the process management platform and comprises a collection of the business processes each trading participant is capable of supporting. For example, one trading participant could access the directory in order to determine whether another trading participant supports a particular business process. In accordance with one embodiment of the invention the directory may be accessed via a web based interface (or any other type of client interface).

In one embodiment of the invention the directory is generated by a service of process management platform 316. Directory services 650 comprise a collection of the business processes each trading participant is capable of supporting. For example, one trading participant could access the directory in order to determine whether another trading participant supports a particular business process.

Directory services 650 may be understood as "yellow pages" of trading participant's business processes. These yellow pages may be implemented by the present invention as a database under the control of the directory services function. FIG. 8 illustrates the relationship between directory services 845 and directory services database 830. The entries stored in directory services database 830 may include information about a trading participant's products, services, and prices. In accordance with one embodiment of the invention, directory services database 830 may be accessed via a web-based interface (or any other type of client interface). The information may also be made available to automatic negotiation services 885 for dynamic searching.

The information stored in directory services database 830 is provided by the trading participants via extensions to the uniform translation format in use. In one embodiment of the invention, for example, when a trading participant broadcasts a new product announcement the information may also be added to the trading participant's entry in directory services database 830 by directory services 845, because directory services 845 may monitor transaction log 800.

Automatic Negotiation of Trading Partner Agreements:

A feature of the present invention is the automatic negotiation of trading participant agreements. The following table illustrates the steps of this process under one embodiment of the present invention. Automatic negotiation may use computer-based transactions to perform tasks traditionally performed by manual processes.

In a common business paradigm, a purchase of a particular hard disk drive might proceed as shown in the left hand column of the following table. The same transaction handled by automatic negotiation is illustrated by the right hand column.

Manual Negotiations Automatic Negotiations

Automatic negotiation 855 may also encompasses the services of digital certificate management. In this function, the present invention may provide digital certificates to trading participants, as a digital certificate authority would. It might also provide functions to assist trading participants in validating digital signatures by maintaining public keys of other trading participants in their profile or directory records. The present invention can be implemented using any form of user authentication, and is not limited to the examples of authentication described here for purposes of illustration of the invention.

Accounting Services:

To facilitate a trading participant's interface to the present invention, the invention may keep data on all the business processes it processes. This information is valuable in billing the trading participants for services rendered by the present invention. In addition, account services can monitor trading participant accounts and service quality based on the transactions recording in the transactions log. This information can be translated into electronic client billing—automating yet another process for trading participants.

The present invention may also manage electronic fund transfers between trading participants, acting as an escrow agent for funds transferred during a transaction.

Figure 5:
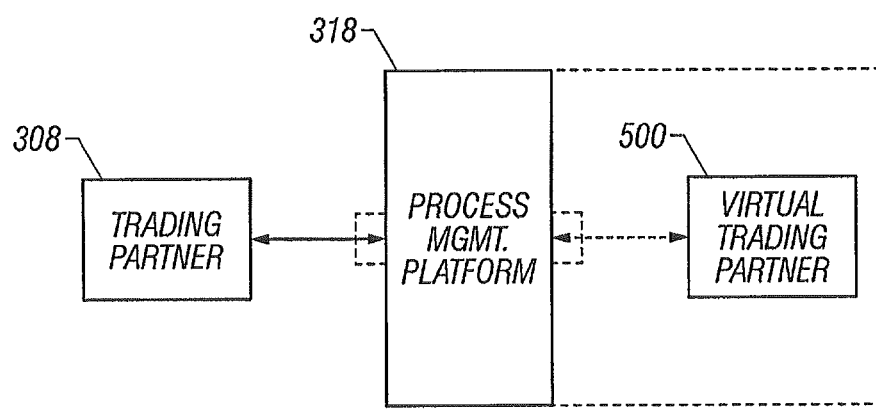
FIG. 5 illustrates the association a virtual trading participant has with the process management system in accordance with one embodiment of the invention.

Virtual Trading participant:

One embodiment of the invention contemplates the construction of a virtual trading participant (e.g., an entity involved in an aspect of a particular business transaction). FIG. 5 illustrates the association a virtual trading participant has with the process management system in accordance with one embodiment of the invention. Virtual trading participant 500 provides a mechanism for testing the connectivity and operational characteristics of a newly or currently connected trading participant 308. For example, in one embodiment of the invention, virtual trading participant 500 acts as a recipient for business process data transmitted by an actual trading participant 308. Thus, trading participant 308 may utilize virtual trading participant 500 to test the system. A trading participant 308 may, for example, utilize virtual trading participant 500 to determine if the data defining individual business processes is in the uniform format understood by the system.

If the system utilizes RosettaNet™ PIPS, virtual trading participant 500 provides a mechanism for new or existing trading participants to determine whether the format conforms to the RosettaNet™ standard. As the standard evolves, trading participants (e.g., 308) may utilize virtual trading participant 500 to ensure compatibility with an identified version of the standard. If trading participant 308 wishes to determine if messages being transmitted comply with a certain version of a standard, trading participant 308 may transmit a fictional set of business process data to virtual trading participant 500. Virtual trading participant 500 is configured to acknowledge the data and reply by transmitting an appropriate response.

Virtual trading participant 500 also provides a way for trading participant 308 to determine if they are prepared to automatically exchange the type of data required to complete a particular business process. Moreover, in one embodiment of the invention virtual trading participant provides a mechanism for generating test reports and determining if process management platform 318 is configured to archive and/or store information about the business process data sent through the process management platform. In one aspect of the invention, the process management platform provides a directory of business processes. The virtual trading participant may provide a way for trading participants to review and/test the ability to access the directory and obtain data about the business processes a particular trading participant is configured to perform. Thus, the virtual trading participant provides a feedback mechanism for determining if a particular trading participant is ready to send, receive, and perform other operations on business process data.

Thus, a method and apparatus for facilitating the management of business processes is described. However, the claims and the full scope of their equivalents define the invention.

The invention claimed is:

1. A method for managing business processes, method comprising:
    obtaining, by a computer, first business process data from a first trading participant, said first business process data comprising a set of transaction messages having a first data format in accordance with a first protocol for conducting business transactions used by the first trading participant;
    receiving, by a virtual trading participant via said computer, fictitious business process data from the first trading participant and acknowledging the fictitious business process data and replying to the first trading participant that the fictitious business process data has been acknowledged in order to enable the first trading participant to determine that the first trading participant is prepared to automatically transmit the first business process data to complete the business transactions;
    said computer testing operational characteristics and a connectivity of a currently trading participant connected to a process management platform accessible via an interconnection fabric, by utilizing the virtual trading participant to determine if the data defining individual business processes is in a uniform format understood by a process management platform; and
    said computer utilizing the virtual trading participant to ensure compatibility with an identified version of the uniform format.

2. The method of claim 1, said method comprising:
    said computer processing the first business process data at the process management platform, wherein the process management platform is configured to manage a flow of the transaction messages and monitor the transaction messages, and wherein the process management platform is configured to automatically determine a second trading participant to satisfy the first business process data;
    said computer identifying a second protocol for conducting the business transactions used by the second trading participant;
    said computer generating second business process data from the first business process data, said second business process data comprising a set of transaction messages having a data format in accordance with the identified second protocol; and
    said computer transmitting the second business process data from the process management platform to the second trading participant, wherein the first and second trading participants conduct the business transactions in accordance with their respective protocols for conducting business transactions.

3. The method of claim 2, wherein said obtaining the first business process data comprises obtaining the first business process data by the process management platform at a process gateway, and wherein the process gateway interfaces with at least one legacy system of one or both of the first trading participant and the second trading participant.

4. The method of claim 2, said method comprising:
    said process management platform broadcasting, via said computer, the first business process data to the second trading participant, wherein the process management platform is configured to utilize at least one open protocol that defines a business process.

5. The method of claim 2, wherein the second protocol differs from the first protocol, and wherein the transaction messages comprise an unencrypted header and encrypted payload data compatible with the first data format, and wherein the method comprises:
    said computer decrypting the encrypted payload data and subsequently re-encrypting the decrypted payload data according to the data format in accordance with the identified second protocol;
    said computer determining that information in the header is compatible with the second trading participant;
    said computer modifying the header, including stripping unneeded information from the header and altering content of the header; and
    said computer digitally signing the modified header.

6. The method of claim 1, wherein the first business process data conforms to the uniform format.

7. The method of claim 1, wherein the process management platform is configured to process at least one proprietary transaction definition format.

8. An apparatus comprising a computer and a computer readable storage medium, said storage medium storing program code configured to be executed by the computer to perform a method for managing business processes, said method comprising:
    said computer obtaining first business process data from a first trading participant, said first business process data comprising a set of transaction messages having a first data format in accordance with a first protocol for conducting business transactions used by the first trading participant;
    receiving, by a virtual trading participant via said computer, fictitious business process data from the first trading participant and acknowledging the fictitious business process data and replying to the first trading participant that the fictitious business process data has been acknowledged in order to enable the first trading participant to determine that the first trading participant is prepared to automatically transmit the first business process data to complete the business transactions;

said computer testing operational characteristics and a connectivity of a currently trading participant connected to a process management platform accessible via an interconnection fabric, by utilizing the virtual trading participant to determine if the data defining individual business processes is in a uniform format understood by a process management platform; and said computer utilizing the virtual trading participant to ensure compatibility with an identified version of the uniform format.

9. The apparatus of claim 8, said method comprising:

said computer processing the first business process data at the process management platform, wherein the process management platform is configured to manage a flow of the transaction messages and monitor the transaction messages, and wherein the process management platform is configured to automatically determine a second trading participant to satisfy the first business process data;

said computer identifying a second protocol for conducting the business transactions used by the second trading participant;

said computer generating second business process data from the first business process data, said second business process data comprising a set of transaction messages having a data format in accordance with the identified second protocol; and said computer transmitting the second business process data from the process management platform to the second trading participant, wherein the first and second trading participants conduct the business transactions in accordance with their respective protocols for conducting business transactions.

10. The apparatus of claim 9, wherein said obtaining the first business process data comprises obtaining the first business process data by the process management platform at a process gateway, and wherein the process gateway interfaces with at least one legacy system of one or both of the first trading participant and the second trading participant.

11. The apparatus of claim 9, said method comprising:

said process management platform broadcasting, via said computer, the first business process data to the second trading participant, wherein the process management platform is configured to utilize at least one open protocol that defines a business process.

12. The apparatus of claim 9, wherein the second protocol differs from the first protocol, and wherein the transaction messages comprise an unencrypted header and encrypted payload data compatible with the first data format, and wherein the method comprises:

said computer decrypting the encrypted payload data and subsequently re-encrypting the decrypted payload data according to the data format in accordance with the identified second protocol;

said computer determining that information in the header is compatible with the second trading participant;

said computer modifying the header, including stripping unneeded information from the header and altering content of the header; and said computer digitally signing the modified header.

13. The apparatus of claim 8, wherein the first business process data conforms to the uniform format.

14. The apparatus of claim 8, wherein the process management platform is configured to process at least one proprietary transaction definition format.

15. A method for facilitating a business process communication, said method comprising:

obtaining, by a computer, first business process data from a first trading participant, said first business process data comprising a set of transaction messages having a first data format in accordance with a first protocol for conducting business transactions used by the first trading participant;

receiving, by a virtual trading participant via said computer, fictitious business process data from the first trading participant and acknowledging the fictitious business process data and replying to the first trading participant that the fictitious business process data has been acknowledged in order to enable the first trading participant to determine that the first trading participant is prepared to automatically transmit the first business process data to complete the business transactions;

said virtual trading participant providing, via said computer, a mechanism for generating test reports and determining if a process management platform accessible via an interconnection fabric is configured to archive or store information about business process data sent through the process management platform;

said process management platform providing, via said computer, a directory of business processes such that the virtual trading participant enables trading participants to review, test, or both review and test an ability to access the directory and obtain data about the business processes a particular trading participant is configured to perform; and said virtual trading participant providing, via said computer, a feedback mechanism for determining if the particular trading participant is ready to send, receive, and perform other operations on business process data.

16. The method of claim 15, said method comprising:

said computer processing the first business process data at the process management platform, wherein the process management platform is configured to manage a flow of the transaction messages and monitor the transaction messages, and wherein the process management platform is configured to automatically determine a second trading participant to satisfy the first business process data;

said computer identifying a second protocol for conducting the business transactions used by the second trading participant;

said computer generating second business process data from the first business process data, said second business process data comprising a set of transaction messages having a data format in accordance with the identified second protocol; and said computer transmitting the second business process data from the process management platform to the second trading participant, wherein the first and second trading participants conduct the business transactions in accordance with their respective protocols for conducting business transactions.

17. The method of claim 15, wherein the process management platform is configured to process at least one proprietary transaction definition format.

18. An apparatus comprising a computer and a computer readable storage medium, said storage medium storing program code configured to be executed by the computer to perform a method for managing business processes, said method comprising:

said computer obtaining first business process data from a first trading participant, said first business process data comprising a set of transaction messages having a first data format in accordance with a first protocol for conducting business transactions used by the first trading participant;

receiving, by a virtual trading participant via said computer, fictitious business process data from the first trading participant and acknowledging the fictitious business process data and replying to the first trading participant that the fictitious business process data has been acknowledged in order to enable the first trading participant to determine that the first trading participant is prepared to automatically transmit the first business process data to complete the business transactions;

said virtual trading participant providing, via said computer, a mechanism for generating test reports and determining if a process management platform accessible via an interconnection fabric is configured to archive or store information about business process data sent through the process management platform;

said process management platform providing, via said computer, a directory of business processes such that the virtual trading participant enables trading participants to review, test, or both review and test an ability to access the directory and obtain data about the business processes a particular trading participant is configured to perform; and said virtual trading participant providing, via said computer, a feedback mechanism for determining if the particular trading participant is ready to send, receive, and perform other operations on business process data.

19. The apparatus of claim 18, said method comprising:

said computer processing the first business process data at the process management platform, wherein the process management platform is configured to manage a flow of the transaction messages and monitor the transaction messages, and wherein the process management platform is configured to automatically determine a second trading participant to satisfy the first business process data;

said computer identifying a second protocol for conducting the business transactions used by the second trading participant;

said computer generating second business process data from the first business process data, said second business process data comprising a set of transaction messages having a data format in accordance with the identified second protocol; and said computer transmitting the second business process data from the process management platform to the second trading participant, wherein the first and second trading participants conduct the business transactions in accordance with their respective protocols for conducting business transactions.

20. The apparatus of claim 18, wherein the process management platform is configured to process at least one proprietary transaction definition format.

* * * * *